July 15, 1958 D. G. KERKER 2,843,738

CIRCUIT ARRANGEMENT FOR PRODUCING PULSES

Filed Oct. 29, 1953

INVENTOR

DORUS GERARDUS KERKER

BY Fred M Vogel

AGENT

United States Patent Office 2,843,738
Patented July 15, 1958

2,843,738

CIRCUIT ARRANGEMENT FOR PRODUCING PULSES

Dorus Gerardus Kerker, Hilversum, Netherlands, assignor, by mesne assignments, to North American Philips Company, Inc., New York, N. Y., a corporation of Delaware Application October 29, 1953, Serial No. 388,975

Claims priority, application Netherlands November 28, 1952

3 Claims. (Cl. 250—36)

The invention relates to a circuit arrangement for producing pulses with the aid of a pulse generator and a reflective delay line.

It is known that a pulse voltage or a voltage step supplied to the input terminals of such a delay line is reflected at the end of the line, since the line is not closed by its surge impedance.

After a time equal to a multiple of the transmit time of the delay line a voltage variation thus occurs at the input of the line. If the line is short-circuited at the end, the polarity of the pulse supplied is reversed at that end when reflected, whereas in the case of an open end the polarity is not reversed.

Circuits of this kind are frequently used for purposes in which a very accurate time interval between two successive pulses is required.

This time interval is determined by the transit time of the delay line. It should be noted, for the sake of completeness, that, if short time intervals are wanted, they may be obtained by deriving the output voltage from tappings of the delay line. Moreover, other pulsatory signals may be derived from the output signal by means of amplitude selection and differentiation.

In known circuits the delay line is traversed only twice, once in the forward direction and, after reflection, once in the reverse direction, so that the maximum delay obtainable by means of such a circuit is equal to twice the transit time of the line.

The invention has for its object to provide a circuit arrangement in which the reflective delay line is traversed four times. Another object is to provide a circuit in which the time durations of pulses produced by a free-running oscillator are accurately controlled by means of a delay line control circuit in such a manner that pulses of approximately the desired time duration will be produced in the event that the delay line control circuit becomes inoperative.

The circuit arrangement according to the invention has the feature that the delay line is included in the output circuit of an amplifier, a pulse voltage derived from the pulse generator and releasing the amplifier being supplied to a control-electrode of this amplifier, this amplifier controlling the pulse generator in a manner such that the pulse voltage stops after a time equal to twice the transit time of the delay line.

In order that the invention may be readily carried into effect, it will now be described with reference to the accompanying drawing, which shows two embodiments of the circuit arrangement according to the invention.

Figure 1:
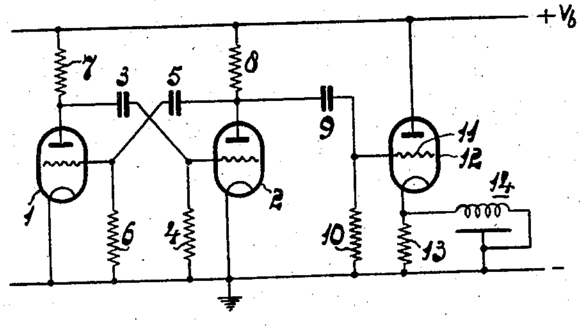
Figure 2:
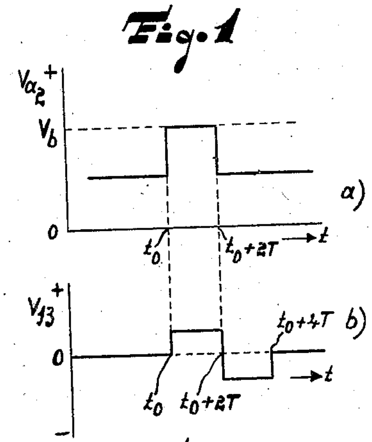
Figure 3:
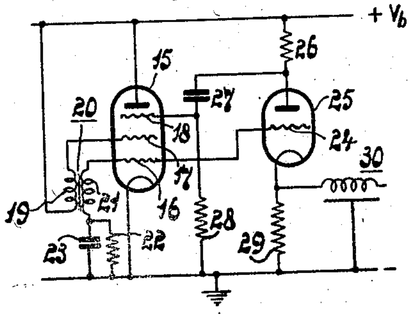

Fig. 1 shows a first embodiment of the circuit arrangement according to the invention, the operation of which will be explained more fully with reference to Figs. 2*a* and 2*b*, and Fig. 3 shows a further embodiment of the circuit arrangement according to the invention.

The tubes 1 and 2 shown in Fig. 1 are connected in known manner as a multivibrator. For this purpose the anode of the tube 1 is connected through a capacitor 3 to the control-grid of tube 2 and this control-grid is connected to earth through a resistor 4. Similarly the anode of tube 2 is connected through a capacitor 5 to the control-grid of tube 1 and this control-grid is connected to earth through the resistor 6. The anode circuit of tube 1 includes the resistor 7 and the anode circuit of tube 2 the resistor 8.

The anode of the tube 8 is connected through a capacitor 9 to the control-grid 11 of a third tube 12, this grid being connected to earth through a resistor 10, the anode of the tube 12 being connected directly to the positive terminal of the anode voltage source.

The cathode of the tube 12 includes the resistor 13, with which the reflective delay line 14 (shown only diagrammatically) is connected in parallel. The delay line 14, the construction of which may be of known kind, is short-circuited at the end.

The value of the resistor 13 is chosen to be equal to that of the surge impedance of the delay line 14.

It is assumed that initially tube 1 is cut off and tube 2 is conductive; then, after a time determined by the time constant of resistor 6 and capacitor 5, tube 1 will become conductive, so that a voltage drop will occur across resistor 7, this voltage drop being transferred through capacitor 3 and resistor 4 to the control-grid of tube 2, this tube being thus cut off.

Then, as is indicated in Fig. 2*a* at the time $t_0$, the anode voltage $V_{a2}$ of tube 2 increases to the battery voltage $V_b$.

This positive voltage step is transferred through capacitor 9 and resistor 10 to the control-grid 11 of tube 12 and is so great that this tube becomes conductive. The time constant of capacitor 9 and resistor 10 must be high relative to the pulse repetition time, whilst the time interval after which tube 2 will again become conductive if the delay line 14 was absent, this interval being determined by the time constant of capacitor 3 and resistor 4, must exceed twice the transit time T of the delay line 14. Since tube 12 becomes conductive, a positive voltage step occurs at resistor 13 at the time $t_0$, as is indicated in Fig. 2*b*, which shows the voltage variation $V_{13}$ across resistor 13. This voltage step is reflected, after a time interval T, at the short-circuited end of the line 14, its polarity being reversed, so that after a time interval $2T$ i. e. at the time $t_0+2T$ a negative voltage step occurs across the resistor 13 at the input of the line 14. As stated above the value of the resistor 13 is equal to the specific impedance of the line 14, so that the voltage step recurring to the input is not again reflected there.

Since the potential of the cathode of tube 12 decreases strongly owing to the negative voltage step across resistor 13, a strong control-grid current begins to flow through this tube, so that resistor 10 is substantially short-circuited by the low internal resistance of the diode, constituted by the control-grid 11 and the cathode of tube 12.

Then the series connection of capacitor 9 and the low resistance of the aforesaid diode are in parallel with the anode resistor 8 of tube 2. Since the impedance of this series connection is low with respect to resistor 8, a negative voltage step is produced at the anode of tube 2. This voltage drop is transferred through the network 5, 6 to the control-grid of tube 1, which is thus cut off. This produces an increase in anode voltage in tube 1, which voltage is thus fed through the network 3, 4 to the control-grid of tube 2, which thus becomes conductive, so that an additional negative voltage step is produced at the anode of tube 2.

The negative voltage step across resistor 13 at the time $t_0+2T$ produces such an increase in anode voltage of tube 2, owing to the accumulating effect of the multivibrator circuit, that the initial positive voltage step ceases. This variation is indicated in Fig. 2*a* at the time $t_0+2T$.

The stop of the positive voltage step at the anode of tube 2 thus involves a stop of the voltage step at the control-grid of tube 12. This control-grid has, consequently, been operative in response to a voltage pulse so that first a positive pulse occurs at resistor 13, this pulse recurring as a negative pulse after reflection in the delay line 14.

The block-wave voltage $V_{13}$ at resistor 13 is therefore positive for a time 2T and then negative for a time 2T. If it is desired to derive from this block-wave voltage for example pulses of the same polarity, having a time interval 4T, this may be carried out by differentiation, a positive pulse occurring at the time $t_0$, a negative pulse at the time $t_0+2T$ and again a positive pulse at the time $t_0+4T$.

Fig. 3 shows a circuit arrangement in which the pulse generator is constructed in the form of a blocking oscillator.

The tube 15 comprises three grids 16, 17 and 18.

The first grid 16 serves as a control-grid and the second grid 17 as the anode of the blocking oscillator. The grid 17 is therefore connected via the primary winding 19 of a transformer 20 to the positive terminal of the anode voltage source.

The control-grid 16 of tube 15 is, moreover, connected to the control-grid 24 of a second tube 25. The anode circuit of tube 25 includes the resistor 26. The anode of tube 25 is connected through the capacitor 27 to the third grid 18 of tube 15, this grid 18 being connected to earth moreover, through the resistor 28.

The cathode circuit of tube 25 includes the resistor 29, which constitutes the input impedance of the delay line 30. The delay line 30 is open at the end, so that a voltage step supplied via the resistor 29 is reflected at the open end after a time interval T equal to the transit time of the delay line and returns to the input with the same polarity after a time interval 2T. The value of the resistor 29 is again equal to the specific impedance of the delay line, in order to avoid further reflection.

Since the operation of the blocking oscillator is sufficiently known, reference will be made thereto only as far as it is necessary for a good understanding of the idea of the invention. It is noted here that as the release of the blocking oscillator current begins to flow to the grid 17 serving as the anode, so that via the transformer 20 the voltage at the control-grid 16 is increased, this increase takes place in an accumulating manner, until, owing to the limitation by the tube properties or for other reasons to be referred to hereinafter, the increase in the current flowing to the grid 17 diminishes and finally the voltage across the secondary winding 21 of the transformer reverses its polarity and the cutting-off effect occurs.

It is assumed that the blocking oscillator is initially cut off; then the tube 25 is also cut off, since the control-grids of the two tubes are connected to one another.

If the blocking oscillator becomes conductive, a positive voltage step occurs at the two control-grids, so that also tube 25 becomes conductive. Thus a positive voltage step occurs at the resistor 29 and a voltage decrease at the anode of tube 25. This decrease is transferred through capacitor 27 and resistor 28 also to the grid 18 of tube 15. Thus the operation of the blocking oscillator is furthered, since electrons emanating from the cathode, having passed through the grid 17 on their way to the anode, are partly reflected to the grid 17, so that they increase the current passing through the primary winding 19 and hence the voltage at the control-grid 16.

The positive voltage step at the resistor 29 in the cathode lead of tube 25 is reflected at the open end of the delay line 30 after a time interval T and returns as a positive voltage step across the resistor 29 after a time interval 2T. Thus the tube 25 is cut off and the voltage at the anode of this tube increases; this voltage increase is transferred to the grid 18 of tube 15. After the foregoing it will be obvious that the electron flow in the tube 15 to the anode and the grid 18 is increased and the electron flow to the grid 17 is decreased, which results in that the voltage across the secondary winding 21 of the transformer 20 reverses its polarity and the blocking oscillator is cut off, so that a cutting-off voltage occurs at the control-grids 16 and 24.

Also in this circuit arrangement the voltage step ceases after a time interval 2T, so that the voltage at the control-grid 24 is a pulsatory voltage. Therefore a first positive pulse having a duration 2T occurs at the resistor 29 and subsequently a negative pulse having a duration 2T. At the occurrence of the negative pulse tube 25 remains cut off, owing to the cutting-off voltage operative at the grid 24.

In the circuit arrangement shown in Fig. 3 the time interval during which the blocking oscillator is conductive in the absence of the delay line must be greater than twice the transit time T of the delay line.

For the sake of completeness it should be noted that multivibrator circuits are known in which one of the tubes is constructed in the form of a triode and the other in the form of a pentode. The control-grid of this pentode is coupled in known manner with the anode of the triode and the screen-grid of the pentode serves as the anode in the multivibrator and is therefore coupled with the control-grid of the triode.

If the positive voltage step for the third tube having an open delay line in the cathode circuit is derived from the anode of the triode, the anode voltage variation of the third tube may be transferred, in accordance with Fig. 3, to the third grid of the pentode. After a time interval 2T the anode voltage of the third tube increases and hence also the voltage at the third grid of the pentode, so that the triode becomes conductive.

It will be evident that the present circuits can also be realized by means of amplifiers of the transistor type in which the cathode of the tube corresponds to the emitter of the transistor, the control grid to the base and the anode to the collector.

What is claimed is:

1. A circuit arrangement for producing controlled pulses from a free-running oscillator, comprising a free-running pulse generator for producing pulses of a given duration in the absence of control, and a control circuit comprising an amplifier having input and output terminals, means connected to feed said last-named pulses to said input terminal, a reflective delay line connected to said output terminal and having a transit time equal to less than half of said given duration, and means connected for feeding reflected pulses from said delay line to said pulse generator to terminate said pulses of a given duration, whereby said oscillator produces pulses of a desired duration as controlled by said control circuit and produces pulses of approximately the desired duration in the event that said control circuit becomes inoperative.

2. A circuit arrangement for producing controlled pulses from a free-running oscillator, comprising a free-running multivibrator oscillator having a pulse output electrode and having two electron discharge devices which are alternately conductive to produce pulses of a given duration in the absence of control, and a control circuit comprising a third electron discharge device having a control electrode and an electron emitter, means connecting said control electrode to said pulse output electrode of said multivibrator, and a reflective delay line connected to said electron emitter and having a transit time equal to less than half of said given duration, whereby said oscillator produces pulses of a desired duration as controlled by said control circuit and produces pulses of approximately the desired duration in the event that said control circuit becomes inoperative.

3. A circuit arrangement for producing controlled pulses from a free-running oscillator, comprising a free-running blocking oscillator having an electron discharge device containing a control electrode and feedback means for blocking said device to produce pulses of a given duration in the absence of control, and a control circuit comprising a second electron discharge device having a control electrode, an electron emitter and an output electrode, means connected to feed said last-named pulses to said control electrode, a reflective delay line connected to said electron emitter and having a transit time equal to less than half of said given duration, and means electrically coupling said output electrode to said first-named control electrode, whereby said oscillator produces pulses of a desired duration as controlled by said control circuit and produces pulses of approximately the desired duration in the event that said control circuit becomes inoperative.

References Cited in the file of this patent

UNITED STATES PATENTS

| | | |
|---|---|---|
| 2,212,173 | Wheeler et al. | Aug. 20, 1940 |
| 2,436,808 | Jacobsen et al. | Mar. 2, 1948 |
| 2,444,438 | Grieg | July 6, 1948 |
| 2,445,448 | Miller | July 20, 1948 |
| 2,447,082 | Miller | Aug. 17, 1948 |
| 2,461,110 | Fischman | Feb. 8, 1949 |
| 2,560,167 | Glenn | July 10, 1951 |
| 2,564,824 | White | Aug. 21, 1951 |
| 2,631,232 | Baracket | Mar. 10, 1953 |
| 2,632,847 | Reed | Mar. 24, 1953 |
| 2,727,228 | Hoeppner et al. | Dec. 13, 1955 |